United States Patent
Anzai et al.

(10) Patent No.: US 7,269,974 B2
(45) Date of Patent: Sep. 18, 2007

(54) BUSHING TEMPERATURE CONTROLLER

(75) Inventors: Iwao Anzai, Fukushima (JP); Noboru Yamaki, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 327 days.

(21) Appl. No.: 10/468,057

(22) PCT Filed: Feb. 15, 2002

(86) PCT No.: PCT/JP02/01300

§ 371 (c)(1),
(2), (4) Date: Aug. 14, 2003

(87) PCT Pub. No.: WO02/064521

PCT Pub. Date: Aug. 22, 2002

(65) Prior Publication Data
US 2004/0065122 A1    Apr. 8, 2004

(30) Foreign Application Priority Data
Feb. 15, 2001   (JP)   ............... 2001-038790

(51) Int. Cl.
*C03B 37/07* (2006.01)
(52) U.S. Cl. ............... 65/488; 65/498; 65/499
(58) Field of Classification Search ......... 65/488, 65/498, 499, 495, 509, 29.19, 126, 160, 162, 65/164, 325; 219/670, 116, 110; 373/39
See application file for complete search history.

(56) References Cited

U.S. PATENT DOCUMENTS

| | | | |
|---|---|---|---|
| 3,730,695 A | * 5/1973 | Varrasso | 65/380 |
| 4,063,145 A | * 12/1977 | Leowald | 363/71 |
| 4,485,296 A | 11/1984 | Ueda et al. | 219/505 |
| 4,594,087 A | 6/1986 | Kuhn | 65/1 |
| 4,657,572 A | 4/1987 | Desai et al. | 65/1 |
| 4,780,120 A | 10/1988 | Varrasso et al. | 65/29 |
| 5,071,459 A | * 12/1991 | Kuhn | 65/384 |

FOREIGN PATENT DOCUMENTS

| | | |
|---|---|---|
| JP | 55-000903 | 1/1980 |
| JP | 56-080712 | 7/1981 |
| JP | 57-139825 | 8/1982 |
| JP | 59-098222 | 6/1984 |
| JP | S 61-228512 | 10/1986 |
| JP | 02-500835 | 3/1990 |
| JP | 08-22758 | 3/1996 |
| JP | 11-327661 | 11/1999 |
| WO | WO89/00309 | 1/1989 |
| WO | WO96/11886 | 4/1996 |
| WO | WO9611886 A1 * | 4/1996 |

* cited by examiner

*Primary Examiner*—Steven P. Griffin
*Assistant Examiner*—Queenie Dehghan
(74) *Attorney, Agent, or Firm*—Morgan, Lewis & Bockius LLP

(57) ABSTRACT

A bushing temperature controller includes a transformer 3 which supplies a main current I1 to the bushing 2 for accommodating molten glass, and regulation current supply units 7 and 8 which are adapted to supply regulation currents I2 and I3 either in phase with the main current I1 or in phase inverted to the main current I1 to a portion of a region to which the transformer 3 applies the current. Thus, the temperature control of partial regions 2a and 2c in the region to which the current is applied can be performed in a wide temperature range.

4 Claims, 3 Drawing Sheets

BUSHING TEMPERATURE CONTROLLER

This application is a 371 of PCT/JP02/01300 filed on Feb. 15, 2002 has been inserted thereof.

TECHNICAL FIELD

The present invention relates to a bushing temperature controller which controls temperature of a bushing used for forming glass fiber.

BACKGROUND ART

Generally, glass fiber forming is performed in the following manner. A plurality of orifices are formed on a bottom of a bushing which accommodates molten glass. Glass fibers are flown out through the orifices, and a plurality of the glass fibers are bundled and wound up. In this process, in order to obtain uniform glass fibers, the bushing needs to be heated uniformly. The heating is performed by applying an electric current to the bushing.

The bushing temperature control has hitherto been performed in such a manner that a thermoelectromotive force of a thermocouple arranged in a center of the bushing is converted into a value of temperature and a predetermined amount of current is applied to the bushing so as to keep the temperature constant.

However, both ends of the bushing tend to have high current densities and to have temperatures higher than the temperature in the center. In such a case, because of the non-uniform temperature distribution of the bushing, the Tex of the glass fibers flowing out from the bushing becomes non-uniform, and quality defects are caused.

In order to prevent such a non-uniform temperature distribution of the bushing, the following techniques of controlling the bushing temperature have been proposed.

The Japanese Patent Laid-Open (Tokukai) No. S-61-228512 publication describes a three-terminal controller for a bushing, which includes a power transformer for supplying a current to the whole of the bushing. A region to which the current is supplied is divided into two regions. The three-terminal controller allows a current applied to each divided region to be regulated by a current bypass circuit using a thyristor. This three-terminal controller for the bushing is designed to prevent the non-uniform temperature distribution of the bushing by regulating amounts of the currents applied to the divided regions.

The Japanese Patent Laid-Open (Tokuhyou) No. H-2-500835 publication describes a bushing temperature controller which includes first, second, and third power transformers. The first transformer supplies a current to the whole of the bushing. A region to which the first transformer supplies the current is divided into three regions. The second and third power transformers separately supply currents to the regions in both ends. This bushing temperature controller is designed to prevent the non-uniform temperature distribution of the bushing by regulating amounts of the currents applied to the regions in the both ends.

Furthermore, the Japanese Patent Laid-Open (Tokukai) No. H-11-327661 publication describes a temperature controller which includes a transformer and shunt circuits. The transformer supplies a current to the whole of the bushing. A region to which the transformer supplies the current is divided into four regions. Each of the shunt circuits bypasses the current flowing through each region. This temperature controller is designed to facilitate segmentation of the region at low costs by forming the shunt circuits with wires and switches.

DISCLOSURE OF THE INVENTION

However, the bushing temperature controllers described above have the following problems.

In the three-terminal controller for a bushing described in the Japanese Patent Laid-Open (Tokukai) No. S-61-228512 publication, the thyristor used for the current bypass circuit is a semiconductor device, therefore it is difficult to locate the thyristor in the vicinity of the bushing which becomes heated. Accordingly, the location thereof is restricted. Moreover, in the three-terminal controller for a bushing, since the amount of the current applied to the bushing cannot be increased, a variable temperature range is narrow.

In the bushing temperature controller described in the Japanese Patent Laid-Open (Tokukou) No. H-8-22758 publication, the temperature regulation is performed by separately supplying currents to the end portions of the bushing. Accordingly, to lower the temperatures at the end portions, it is necessary to reduce the amounts of the currents supplied thereto. In the case that the amounts of currents are set to zero but the temperatures need to be further lowered, it is required to regulate the amount of the current supplied by the first power transformer or to adjust a cooling fin located under the bushing for rapidly cooling the molten glass drawn out from a number of orifices. Accordingly, the operation of the temperature regulation becomes complicated.

In the temperature controller described in the Japanese Patent Laid-Open (Tokukai) No. H-11-327661 publication, the amounts of current bypassed by the shunt circuits cannot be regulated. Accordingly, even when fine temperature control is to be carried out, hunting is caused, and variation in Tex could be caused.

Therefore, the present invention is made to solve such technical problems. An object of the present invention is to provide a bushing temperature controller which can easily perform temperature control of the bushing in a wide temperature range.

Specifically, a bushing temperature controller according to the present invention includes a main current supply unit for supplying a main current to a bushing for accommodating molten glass; and a regulation current supply unit which is adapted to supply a current for regulation either in phase with the main current or in 180 degrees out of phase with the main current to a portion of a region to which the main current supply unit applies the current.

The bushing temperature controller according to the present invention is provided with at least two regulation current supply units. Each of the regulation current supply units supplies the current for regulation to a region at each end of the region to which the main current supply unit applies the current.

In the bushing temperature controller according to the present invention, the regulation current supply unit has a phase reverse function of reversing a phase of the current to be supplied.

In the bushing temperature controller according to the present invention, the regulation current supply unit has a current change function of changing an amount of the current for regulation to be supplied.

According to the present invention, the current for regulation can be supplied in phase with the main current or in phase inverted to the main current. Therefore, when the regulation current is supplied in phase with the main current and the amount of the current applied to the partial region of the bushing is increased to more than the main current, the temperature can be regulated by heating. On the other hand, when the current for regulation is supplied in phase inverted to the main current and the amount of current applied to the partial region of the bushing is reduced to less than the main current, the temperature can be regulated by cooling. Therefore, by properly supplying the current for regulation in phase with the main current or in phase inverted to the main current, the temperature control can be performed in a wide temperature range. Consequently, the glass fiber forming can be stably performed with no need to frequently change the amount of the main current, and the fiber forming can be thus efficiently performed.

BEST MODES FOR CARRYING OUT THE INVENTION

Figure 1:
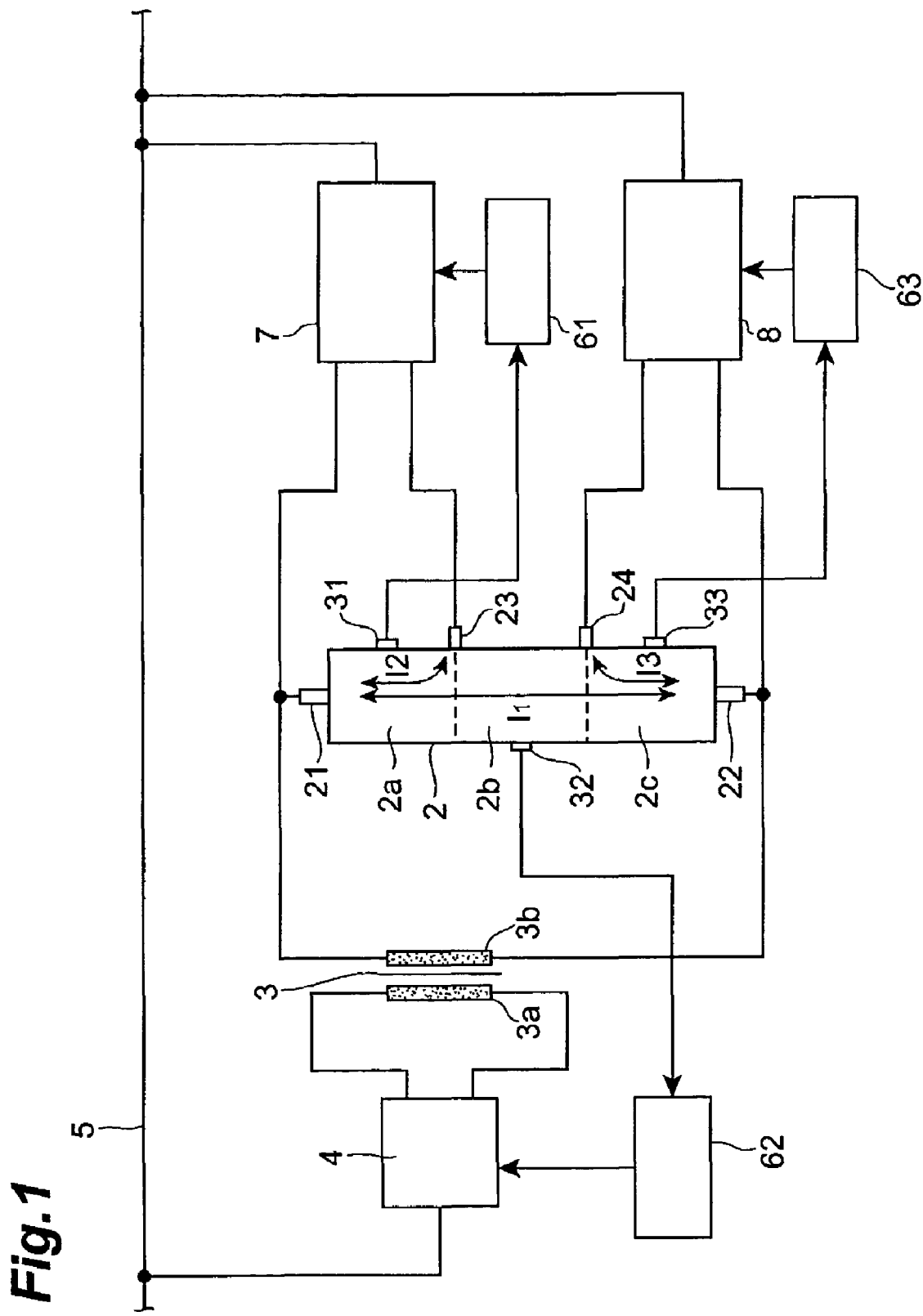
FIG. 1 is a diagram showing a constitution of a bushing temperature controller according to an embodiment of the present invention.

Hereinafter, a description will be made of an embodiment of the present invention based on the accompanying drawings. In the drawings, the same components are given the same reference numerals, and redundant description will be omitted. The dimensional proportions in the drawings are not necessarily the same as those in the description.

FIG. 1 shows a schematic diagram of a constitution of a bushing temperature controller according to the embodiment.

As shown in the drawing, a bushing temperature controller 1 according to the embodiment is an apparatus performing temperature control of a bushing 2, which controls temperature of the bushing 2 by supplying a predetermined current to the bushing 2 and regulating an amount of the applied current. The bushing 2 is a container which accommodates molten glass. The molten glass is flown out from a number of orifices (not shown) formed on a bottom of the bushing 2 to form fibers. The bushing 2 is composed of a conductive material, for example, platinum, an alloy thereof, or the like.

The bushing temperature controller 1 includes a transformer 3 which supplies a current to the bushing 2. The transformer 3 functions as main current supply means for supplying a main current I1 to the whole of the bushing 2 and uses, for example, a power transformer. A primary winding 3a of the transformer 3 is connected to a power controller 4. The power controller 4 controls an output of the transformer 3. The power controller 4 is connected to a power line 5 as an alternating current source and receives power supply from the power line 5.

At both ends of the bushing 2, input terminals 21 and 22 are provided. The input terminals 21 and 22 are connected to a secondary winding 3b of the transformer 3 and receive supply of the main current I1 from the transformer 3. The bushing 2 is provided with intermediate terminals 23 and 24. The intermediate terminals 23 and 24 are arranged between the input terminals 21 and 22. A region of the bushing 2 between the input terminals 21 and 22 is equally divided into three regions, which are a first region 2a, a second region 2b, and a third region 2c starting from a side of the input terminal 21. The intermediate terminal 23 is located at a boundary between the first and second regions 2a and 2b. The intermediate terminal 24 is located at a boundary between the second and third regions 2b and 2c.

In the second region 2b of the bushing 2, a temperature sensor 32 is located. The temperature sensor 32 is a temperature detection means for detecting temperature of the second region 2b, which is the middle region of the bushing 2, and uses, for example, a thermocouple. The temperature sensor 32 is connected to a temperature control unit 62 and outputs a temperature detection signal to the temperature control unit 62. The temperature control unit 62 outputs a control signal to the power controller 4 based on the temperature detection signal of the temperature sensor 32.

The bushing temperature controller 1 includes regulation current supply units 7 and 8. The regulation current supply units 7 and 8 are regulation current supply means for allowing a current for regulation to be supplied in phase with the main current I1 or in phase inverted to the main current I1 to a portion of a region to which the transformer 3 applies the current. The regulation current supply unit 7 is connected to the input terminal 21 and the intermediate terminal 23 and supplies a regulation current I2 in phase with the main current I1 or in phase inverted to the main current I1 to the first region 2a, which is the partial region of the region to which the transformer 3 applies the current. The regulation current supply unit 7 will be described later in detail.

The regulation current supply unit 8 is connected to the input terminal 22 and the intermediate terminal 24 and supplies a regulation current I3 in phase with the main current I1 or in phase inverted to the main current I1 to the third region 2c, which is the partial region of the region to which the transformer 3 applies the current.

In the first region 2a of the bushing 2, a temperature sensor 31 is located. The temperature sensor 31 is a temperature detection means for detecting temperature of the first region 2a, which is an end region of the bushing 2, and uses, for example, a thermocouple. The temperature sensor 31 is connected to a temperature control unit 61 and outputs a temperature detection signal to the temperature control unit 61.

In the third region 2c of the bushing 2, a temperature sensor 33 is located. The temperature sensor 33 is a temperature detection means for detecting a temperature of the third region 2c, which is the end region of the bushing 2 and, for example, uses a thermocouple. The temperature sensor 33 is connected to a temperature control unit 63 and outputs a temperature detection signal to the temperature control unit 63.

Figure 2:
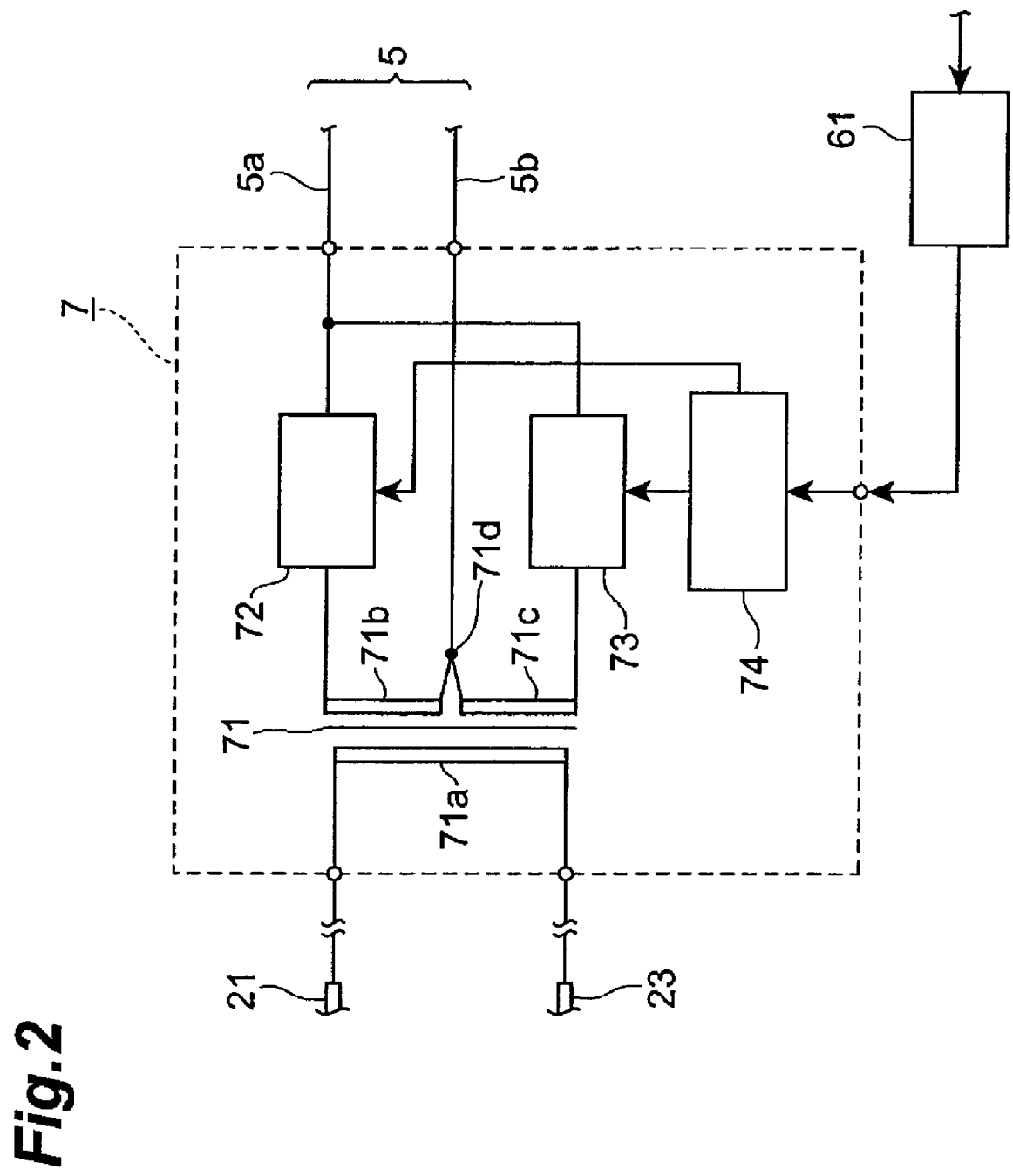
FIG. 2 is an explanatory view showing a regulation current supply unit of the bushing temperature controller of FIG. 1.

FIG. 2 shows a diagram showing the constitution of the regulation current supply unit 7.

As shown in the drawing, the regulation current supply unit 7 includes a transformer 71 which supplies a current between the input terminal 21 and the intermediate terminal 23. A secondary winding 71a of the transformer 71 is connected to the input terminal 21 and the intermediate terminal 23 of the bushing 2. The primary side of the transformer 71 is constituted by connecting primary windings 71b and 71c in series.

One end of the primary winding 71b is connected to a power regulator 72, and the other end thereof is connected to an intermediate tap 71d. The power regulator 72 regulates a power amount of the primary winding 71b and is constituted by using, for example, a switching device such as thyristor. The input side of the power regulator 72 is connected to an electric wire 5a of the power line 5. The power line 5 is composed of two electric wires of the electric wire 5a and an electric wire 5b.

The intermediate tap 71d is an intermediate terminal located between the primary windings 71b and 71c. The intermediate tap 71d is connected to the electric wire 5b of the power line 5.

One end of the primary winding 71c is connected to a power regulator 73, and the other end thereof is connected to the intermediate tap 71d. The power regulator 73 regulates a power amount of the primary winding 71c and is constituted, for example, by using a switching device such as a thyristor, similarly to the power regulator 72. The input side of the power regulator 73 is connected to the electric wire 5a of the power line 5.

The regulation current supply unit 7 includes a control unit 74. The control unit 74 outputs control signals to the power regulator 72 and 73 based on an output signal from the temperature control unit 61 and controls activation of the power regulators 72 and 73. For example, the control unit 74, based on the output signal from the temperature control unit 61, activates one of the power regulators 72 and 73 and inactivates the other to set the regulation current I2, which is the output current from the regulation current supply unit 7, to a current in phase with the main current I1.

Further, the control unit 74 inactivates one of the power regulators 72 and 73 and activates the other to set the regulation current I2 to a current in phase inverted to the main current I1. Furthermore, the control unit 74 inactivates both of the power regulators 72 and 73 to set the regulation current I2 to zero.

Based on the control signal of the control unit 74, the amounts of current through the power regulators 72 and 73 and the amounts of current through the primary windings 71b and 71c and the secondary winding 71a are regulated, and the regulation current I2 of the regulation current supply unit 7 is thus controlled.

The regulation current supply unit 8 is constituted similarly to the above described regulation current unit 7 and operates similarly. Specifically, the regulation current supply unit 8 includes a transformer (not shown) which supplies a current between the input terminal 22 and the intermediate terminal 24. The regulation current supply unit 8, based on the output signal from the temperature control unit 62, properly changes a direction of a current on the primary side of the transformer and outputs the regulation current I3 in phase with the main current I1 or in phase inverted to the main current I1.

Next, a description will be made of an operation of the bushing temperature controller according to the embodiment.

In FIG. 1, first, the temperature of the bushing 2 is set in accordance with a diameter of glass fibers to be formed by the bushing 2. The setting of the temperature is performed by setting heating temperatures at the temperature controllers 61, 62, and 63.

The temperature control unit 62 activates the power controller 4 and the transformer 3 based on the set temperatures and the output signal from the temperature sensor 32. With the activation of the power controller 4 and the transformer 3, the main current I1 is applied to the first, second, and third regions 2a, 2b, and 2c between the input terminals 21 and 22 of the bushing 2. The bushing 2 is thus heated.

In this process, if the temperature of the second region 2b of the bushing 2 is lower than the set temperature, the output from the transformer 3 is increased. Accordingly, the main current I1 is increased, and the temperature of the bushing 2 rises. On the other hand, when the temperature of the second region 2b of the bushing 2 is higher than the set temperature, the output from the transformer 3 is reduced. Thus, the main current I1 is reduced, and the temperature of the bushing 2 drops.

Meanwhile, the temperature control unit 61 activates the regulation current supply unit 7 based on the set temperature and the output signal from the temperature sensor 31. With the activation of the regulation current supply unit 7, the regulation current I2 is applied to the first region 2a between the input terminal 21 and the intermediate terminal 23 of the bushing 2. Thus, the total amount of current applied to the first region 2a becomes a sum of the main current I1 and the regulation current I2.

In this process, if the temperature of the first region 2a of the bushing 2 is lower than the set temperature, the regulation current I2 outputted from the regulation current supply unit 7 is set to be in phase with the main current I1. Thus, the amount of current applied to the first region 2a is increased, and the temperature of the first region 2a rises. On the other hand, when the temperature of the first region 2a of the bushing 2 is higher than the set temperature, the regulation current I2 outputted from the regulation current supply unit 7 is set to be in phase inverted to the main current I1. Thus, the amount of current applied to the first region 2a is reduced, and the temperature of the first section 2a drops.

In such a manner, by properly supplying the regulation current I2 flowing in the first region 2a of the bushing 2 in phase with the main current I1 or in phase inverted to the main current I1, the temperature control of the first region 2a as the end region of the bushing 2 can be performed in a wide temperature range.

Accordingly, it is unnecessary to frequently change the amount of the main current I1 in accordance with the diameter of the glass fibers to be manufactured, and the glass fiber forming can be stably performed. Thus, the fiber forming can be efficiently performed. Moreover, the transformer 71 of the regulation current supply unit 7 can use a transformer having a low rating, and costs of the bushing temperature controller 1 can be reduced.

Note that when the temperature of the first region 2a of the bushing 2 is the same as the set temperature, the regulation current I2 outputted from the regulation current supply unit 7 is set to zero. In this case, the amount of current applied to the first region 2a does not change, and the temperature of the first region 2a is maintained.

The temperature control unit 63 activates the regulation current supply unit 8 based on the set temperature and the output signal from the temperature sensor 33. With the activation of the regulation current supply unit 8, the regulation current I3 is applied to the third region 2c between the input terminal 22 and the intermediate terminal 24 of the bushing 2. Thus, the total amount of current applied to the third region 2c becomes a sum of the main current I1 and the regulation current I3.

In this process, when the temperature of the third region 2c of the bushing 2 is lower than the set temperature, the regulation current I3 outputted from the regulation current supply unit 8 is set to be in phase with the main current I1. Thus, the amount of current applied to the third region 2c is increased and the temperature of the third region 2c rises. On the other hand, when the temperature of the third region 2c of the bushing 2 is higher than the set temperature, the regulation current I3 outputted from the regulation current supply unit 8 is set to be in phase inverted to the main current I1. Thus, the amount of current applied to the third region 2c is reduced and the temperature of the third region 2c drops.

In such a manner, by properly supplying the regulation current I3 flowing in the third region 2c of the bushing 2 in phase with the main current I1 or in phase inverted to the main current I1, the temperature control of the third region 2c as the end region of the bushing 2 can be performed in a wide temperature range.

Accordingly, it is unnecessary to frequently change the amount of the main current I1, and the glass fiber forming can be stably performed. Thus, the fiber forming can be efficiently performed. Moreover, the transformer of the regulation current supply unit 8 can use a transformer having a low rating, and costs of the bushing temperature controller 1 can be reduced.

Note that when the temperature of the third region 2c of the bushing 2 is the same as the set temperature, the regulation current I3 outputted from the regulation current supply unit 8 is set to zero. In this case, the amount of current applied to the third region 2c does not change, and the temperature of the third region 2c is maintained.

Figure 3:
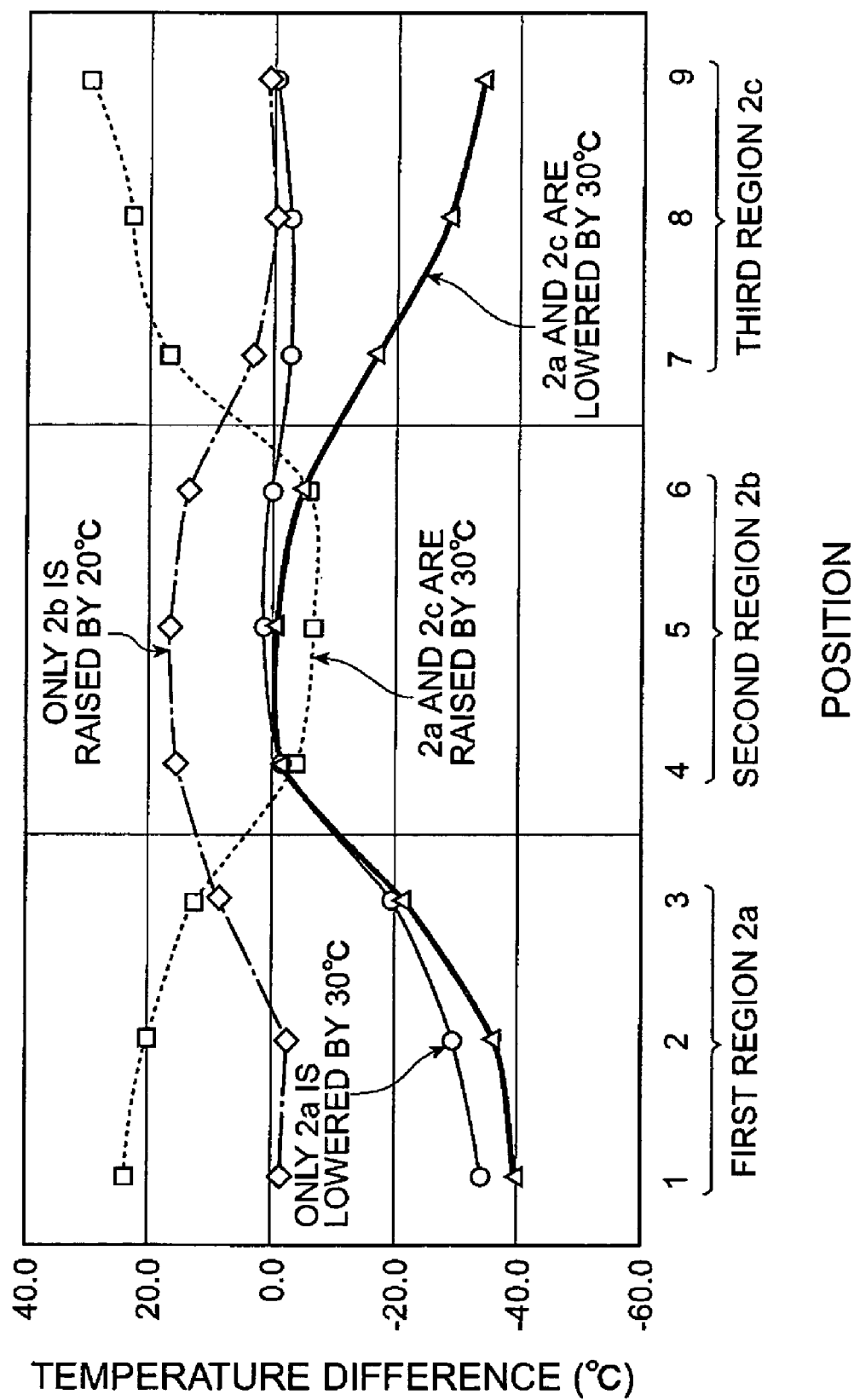
FIG. 3 is a graph showing a result of actual temperature control in the bushing temperature controller according to the embodiment.

FIG. 3 shows a result of the temperature control when the bushing temperature controller according to the embodiment is actually operated.

In FIG. 3, the axis of abscissas represents a position along the direction of the current applied to the bushing 2, and the axis of ordinates represents a temperature difference from a predetermined reference temperature. For the bushing 2 subjected to the temperature control, a bushing which was made of an alloy of 90% of platinum and 10% of rhodium was used. The bushing was box-shaped and included 1200 orifices for drawing out the molten glass on the bottom thereof.

As shown in the drawing, when only the set temperature of the first region 2a was lowered by 30° C. (line connecting circles: ○-○), the temperature of the first region 2a became about 30° C. lower than the temperatures of the second and third regions 2b and 2c. When the set temperatures of the first and third regions 2a and 2c were lowered by 30° C. (line connecting triangles: Δ-Δ), the temperatures of the first and third regions 2a and 2c became about 30° C. lower than the temperature of the second region 2b.

When the set temperatures of the first and third regions 2a and 2c were raised by 30° C. (line connecting squares: □-□), the temperature of the first and third regions 2a and 2c became about 30° C. higher than the temperature of the second region 2b. When only the set temperature of the second region 2b was raised by 30° C. (line connecting rhombuses: ◇-◇), the temperature of the second region 2b became about 20° C. higher than the temperature of the first and third regions 2a and 2c.

Such results reveal that the temperature can be regulated according to the theory by the application of the regulation current in phase with the main current or in phase inverted to the main current.

As described above, according to the bushing temperature controller 1 of the embodiment, the regulation currents I2 and I3 can be supplied in phase with the main current I1 or in phase inverted to the main current I1. Therefore, when the regulation currents I2 and I3 are supplied in phase with the main current I1 and the amount of the current applied to the partial region of the bushing 2 is increased to more than the main current I1, the temperature can be regulated by heating. Moreover, when the regulation currents I2 and I3 are supplied in phase inverted to the main current I1 and the amount of current applied to the partial region of the bushing 2 is reduced to less than the main current I1, the temperature can be regulated by cooling. Therefore, by properly supplying the regulation currents I2 and I3 in phase with the main current I1 or in phase inverted to the main current I1, the temperature control can be performed in a wide temperature range. Consequently, the glass fiber forming can be stably performed with no need to frequently change the amount of the main current, and the fiber forming can be stably performed.

In the embodiment, the description has been made of the case where the region of the bushing 2 to which the current is applied is divided into three regions, but the bushing temperature controller according to the present invention is not limited to such a case. The region of the bushing 2 to which the current is applied may be divided into two, four, or more regions, and the bushing temperature controller may apply the regulation current to a part of the divided regions in phase with the main current or in phase inverted to the main current. Also in this case, operational advantages similar to those of the bushing temperature controller according to the embodiment can be obtained.

INDUSTRIAL APPLICABILITY

The present invention is applicable in the glass fiber forming.

The invention claimed is:

1. A bushing temperature controller, comprising:
a main current supply unit which supplies a main current to a bushing for accommodating molten glass; and
a regulation current supply unit comprising a transformer;
the primary side of said transformer comprising two primary windings, wherein
the electric power is separately supplied to each of said primary windings so that the phase of the electric current applied to one of said primary windings is opposite to that of the other;
the regulation current supply unit further comprising two regulators,
which regulate the electric power into said primary windings respectively;
the regulation current supply unit further comprising a control unit,
which outputs a control signal to said regulators;
said regulators receiving the control signal separately;
wherein at least two regulation current supply units are provided and each of the regulation current supply units supplies the current for regulation to a region at each end of the region to which the main current supply unit applies the current; and
wherein said primary windings are connected in series.

2. The bushing temperature controller according to claim 1, wherein the regulation current supply unit includes a current change function of changing an amount of the current for regulation to be supplied.

3. A bushing temperature controller, comprising:
a main current supply unit which supplies a main current to a bushing for accommodating molten glass; and
a regulation current supply unit comprising a transformer;
the primary side of said transformer comprising two primary windings, wherein
the electric power is separately supplied to each of said primary windings so that the phase of the electric current applied to one of said primary windings is opposite to that of the other;
the regulation current supply unit further comprising two regulators, which regulate the electric power into said primary windings respectively;

the regulation current supply unit further comprising a control unit, which outputs a control signal to said regulators;

said regulators receiving the control signal separately;

wherein at least two regulation current supply units are provided and each of the regulation current supply units supplies the current for regulation to a region at each end of the region to which the main current supply unit applies the current;

wherein said primary windings are connected in series; and wherein during operation of the bushing temperature controller, both of the two primary windings are never simultaneously supplied with power.

4. The bushing temperature controller according to claim 3, wherein the regulation current supply unit includes a current change function of changing an amount of the current for regulation to be supplied.

* * * * *